_

3,052,652
ALKOXYLATED POLYVINYL ALCOHOL

Benjamin D. Halpern, Jenkintown, Pa., and Bruno O. Krueger, Seattle, Wash., assignors to The Borden Company, a corporation of New Jersey
No Drawing. Filed Feb. 26, 1958, Ser. No. 717,552
1 Claim. (Cl. 260—73)

This invention relates to alkoxylated, i.e. hydroxyalkylated, polyvinyl alcohol and the process of making it by the action of an alkylene oxide or styrene oxide under special conditions with polyvinyl alcohol.

When an alkylene oxide is reacted conventionally with polyvinyl alcohol (PVA), difficulties arise, partly because the alkylene oxide brought into contact with the particles of solid PVA gives first swelling or colloiding of the surfaces of the particles. The particles then agglomerate into masses so large as to interfere with uniform access of the alkylene oxide to the PVA.

We have now discovered a means of alkoxylating polyvinyl alcohol to high degree with the production of a free-flowing, granular, satisfactorily uniform product of dependable viscosity and light color that is not rubbery and is easily separated from other materials present after completion of the reaction. We avoid the use of a large excess of the alkylene oxide, preserve the PVA in fine suspension during the reaction, and control well the reaction.

The process of the invention comprises maintaining contact of polyvinyl alcohol in finely divided solid form with an alkylene oxide or styrene oxide at reaction temperature and in contact with an insolubilizing (anti-agglomerating) liquid that is immiscible with water, PVA, and its alkoxylation product but is miscible with the alkylene oxide, the said insolubilizing liquid maintaining in solid form and also suspending any PVA or its alkoxylated product that would otherwise soften and agglomerate in the alkylene oxide or its reaction product with the PVA. The invention, in one embodiment, comprises removal of the 3% or so of water normally present in commercial PVA before the reaction with the alkylene oxide is initiated.

A representative one of the reactions involved in the alkoxylation is the formation of a hydroxy alkyl ether, as illustrated by the following equation when the oxide used is ethylene oxide, it being understood that we polyethoxylate products of chain lengths that may be long.

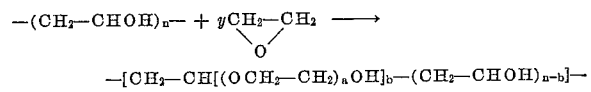

In this equation "$n$" is a number which, by its size, shows the degree of polymerization of the vinyl alcohol and, therefore, the mean molecular weight of its polymer; "$y$" is the molecular ratio of ethylene oxide to the original vinyl alcohol units in the ethoxylated product (if the finished product, for instance, is to contain 0.3 ethylene oxide units for 1 of vinyl alcohol, then "$y$" would be 0.3 increased by expected losses); "$a$" is the number of ethylene oxide units that have reacted with a single OH on the chain; and "$b$" is the number of secondary hydroxyls on the original chain that are reacted. The number of free hydroxyls that are left on the chain are, therefore, the original number "$n$" minus "$b$."

The water content that characterizes commercial polyvinyl alcohol reacts also with the alkylene oxide, the product of the reaction with the water being first a glycol and then an ethoxylated or a polyethoxylated glycol. Thus 3 parts of water, reacting with ethylene oxide, would give somewhat more than 10 parts of ethylene glycol and still greater amounts of ethoxylated glycols.

We are able to prevent the formation of glycols, in our process and product, by distilling out the water with our said insolubilizing liquid immediately before reaction with the alkylene oxide is undertaken.

In general, the process of the invention is carried out as follows. Solid polyvinyl alcohol is finely subdivided or powder form is mixed with the insolubilizing liquid. The suspension so made may then be subjected to distillation, with trapping out of the water fraction of the condensate. The water thus separated is withdrawn from the system and the liquid immiscible therewith, which has assisted in carrying over the water during the distillation, is returned to the still. This distillation and water separation is continued until no further water comes over.

Into the suspension of solid PVA in the insolubilizing liquid the selected alkylene oxide is then introduced with continuous agitation, the oxide suitably being introduced slowly or in small increments as the reaction proceeds. This oxide dissolves in the said liquid and passes gradually into the suspended solid particles. Because the concentration of unreacted alkylene oxide in insolubilizing liquid is low at all times, ordinarily less than 10%–25% of the liquid phase, the chemical reaction of the oxide and PVA is necessarily slow. There is thus avoided any uncontrollable overheating, local or otherwise, by the exothermic reaction. There is provided time for diffusion of the alkylene oxide into the interior of the solid particles, with minimization of overalkoxylation on the surfaces of the particles. Also the insolubilizing liquid, being a precipitant for any dissolved or colloided PVA and its reaction product, prevents surface softening and subsequent agglomeration of the PVA or said product into masses that would prevent proper access of the oxide to the particles.

When all of the alkylene oxide has been introduced into the liquid and the prevailing pressure in the system or other evidence shows, on the basis of experience, that the alkoxylation has proceeded to the desired extent, the two phases that remain are separated, as by centrifuging or distilling away the insolubilizing liquid and any remaining alkylene oxide. This leaves a residue of granular and satisfactorily uniformly alkoxylated PVA of the desired viscosity when put into the aqueous solution and of light color.

As to materials, the polyvinyl alcohol is one made in any conventional manner by alkali hydrolysis of polyvinyl acetate. It may also be made by alkali hydrolysis of an alkali-hydrolyzable copolymer such as that of vinyl acetate with another monomer, as, for example, methyl methacrylate, $C_2$–$C_8$ alkyl methacrylates, vinyl chloride, and vinylidene chlorides. In this case, the resulting mixture of polyvinyl alcohol and remaining polymer or copolymer is alkoxylated as described herein for polyvinyl alcohol. The hydrolysis may be about 40%–100% complete. The viscosity in a 40% aqueous solution is about 2–100 cps. Polyvinyl alcohols 90%–98% hydrolyzed and with solution viscosities of about 16–60 cps. are particularly suitable. The polyvinyl alcohol as used should be ground to pass through an 80-mesh screen and operation is improved if it is ground to a practically impalpable powder.

The oxide used may be any of the 1,2 and 1,3 $C_2$–$C_4$ alkylene oxides, namely, ethylene, propylene, or butylene oxide. Styrene oxide and like oxides of the vinyl group also are suitable. These oxides are all mono-epoxy. The higher boiling members of the alkylene oxide family and such materials as trimethylene oxide are operable but not recommended, partly because of the excessive slowness of their reaction.

The insolubilizing and suspending liquid must be chemically inert to but miscible with the alkylene oxide, volatilizable, and a non-solvent for polyvinyl alcohol and its alkoxylated product. It should form an azeotrope with water or be distillable therewith, if it is to assist in removing water by distillation from the PVA. Liquids with boiling points within the range 30°–100° C. give best economy in equipment and operation but liquids that have higher or lower boiling points and which meet the other requirements are usable. The hydrocarbon liquids of the class illustrated by pentane, hexane, heptane, cyclohexane, benzene and toluene, are examples of such liquids that are relatively inexpensive and are the ones ordinarily selected. Other liquids that may be used less economically are ethylene dichloride and perchlorethylene.

As to proportions, the amount of the insolubilizing liquid used is such as to give to the polyvinyl alcohol-liquid mixture a consistency or viscosity sufficiently low for good agitation. The proportion may vary from approximately 20–200 parts or more by weight for 100 of the polyvinyl alcohol. Usually, we introduce 100–150 parts for 100 of polyvinyl alcohol. The amount of this liquid must be, as a minimum, that causing the alkylene oxide (diluted with the said liquid) not to be a solvent for either PVA or its alkoxylated product.

The minimum proportion of alkylene oxide charged is determined by the degree of alkoxylation required, as for proper solubility, viscosity, and mechanical properties of the alkoxylated product in the particular use for which the product is intended. Since we do not require and do not want solvent action of the alkylene oxide on the solid particles in our reaction, we use little or no excess over the theoretical amount of the oxide to be reacted. Suitable proportions are 5–100 parts and commercially about 25–75 for 100 PVA. With the more slowly reactive higher boiling alkylene oxides, however, we use to advantage a several-fold excess to promote reaction.

As to operating conditions, the distillation to dehydrate the polyvinyl alcohol is most conveniently done with fractionation at atmospheric pressure, although we may use reduced pressure with the higher boiling insolubilizing liquid and elevated pressure with the lower boiling insolubilizing liquids.

In hydroxylating the polyvinyl alcohol with the more reactive alkylene oxides, such as ethylene and propylene oxides, we find it helpful to add the alkylene oxide to the reactor as a small continuous stream or in a series of small increments. This prevents the accumulation of unreacted oxide in high concentration. When the less reactive alkylene oxides are used or when the degree of alkoxylation to be effected is low, we may add all of the alkylene oxide at the start.

Reaction temperatures of about 80°–100° C. give good results. At temperatures much lower, the reaction becomes objectionably slow. At higher temperatures as up to 130°, the control of the exothermic reaction and avoidance of discoloration are more difficult.

With the addition of a catalyst, however, we may alkoxylate at lower temperatures, such as 50°–80° C. or increase the reaction rate of the less reactive alkylene oxides at the higher temperatures. Catalysts that may be used are those usual for alkoxylation, as, for example, sodium hydroxide, calcium hydroxide, potassium acetate, and quaternary ammonium compounds.

Operating pressure depends mainly upon the vapor pressure of the particular insolubilizing liquid and alkylene oxide used, the concentration of the latter in the said liquid, and the operating temperature. Commonly, the pressure is approximately in the range 50–150 p.s.i. We continue the reaction until the desired degree of alkoxylation has been obtained. When using ethylene oxide, for example, we find that the end point of the reaction may be conveniently determined by observing the time when the pressure at constant temperature within the reactor becomes practically constant. When less reactive alkylene oxides are used, the reaction time of reaction is determined from a previously prepared time-temperature schedule or by periodic analytical check of reactor contents for extent or constancy of alkoxylation by determination of the remaining alkylene oxide.

When it is desired to lighten the color of the alkoxylated product, sulfur dioxide is maintained in contact with the product until the desired bleaching is effected, suitably during the drying step and with about 0.1–1% of the dioxide on the weight of the product.

Separation of the alkoxylated polyvinyl alcohol may be and suitably is carried out by any of several conventional methods. These include centrifuging, oven and also drum drying which permit both separation and recovery of the liquid phase materials as well as the granular alkoxylated product constituting the solid phase. The separation is continued until the product is free of the liquid phase materials including the insolubilizing liquid and any excess of alkylene oxide that may have remained as the liquid phase. Odor of the product is a good control.

The invention will be further illustrated by description in connection with the following examples. In these examples and elsewhere herein proportions are expressed as parts by weight unless specifically stated otherwise, all pressures are gauge pressures, and all equipment used is conventional and, therefore, not illustrated.

*Example 1*

50 parts of polyvinyl alcohol, which was 98% hydrolyzed from polyvinyl acetate and as a 4% aqueous solution at 20° C. has a viscosity of 16 cps., was charged with 750 parts of n-hexane into a pressure reactor equipped with stirrer, vapor column, condenser, water trap, pressure gauge and thermometers. The mixture was stirred and brought to boil, whereupon a mixture of water and hexane was delivered from the condenser to the trap. Operation was continued until no more water was recovered, the hexane being returned continuously to the still. The total amount of water separated was equivalent to about 3% of the weight of polyvinyl alcohol charged.

The reactor was then closed for pressure operation, the temperature was raised to about 85° C. and 209 parts of ethylene oxide was pumped in slowly. The operation was continued for 2 hours, during which time the peak temperature was 100.9° C. and the average 99° C. The peak pressure was 75 p.s.i. and the average 70 p.s.i.

The product was then dried, by distilling away volatiles constituting the liquid phase. This leaves light colored, granular, free flowing ethoxylated polyvinyl alcohol with an ethoxy content of 29.5%, corresponding to about 99% of the ethylene oxide charged.

*Example 2*

Polyvinyl alcohol, of the same lot as in Example 1, 686 parts and n-heptane 1000 parts were charged to the same reactor and the polyvinyl alcohol was dehydrated as before. The polyvinyl alcohol was then ethoxylated for 6 hours at temperatures up to 85° C. with approximately 200 parts of ethylene oxide, and under pressures averaging about 30 p.s.i. A light colored product was recovered on evaporation of the heptane. The amount of ethoxylation was found to be 22.0%, with almost complete utilization of the ethylene oxide.

*Example 3*

The same lot of polyvinyl alcohol 100 parts and 112 parts of n-pentane were charged to a reactor and the polyvinyl alcohol ethoxylated, without dehydration, with 60.5 parts of ethylene oxide. Reaction was continued for 2 hours at an average temperature of 97° C. and an average pressure of 139 p.s.i. A light colored product was obtained, which on evaporation of the pentane and excess ethylene oxide, without evaporating glycols present, showed absorption of 28.2% of ethylene oxide calculated on the weight of PVA used, corresponding to utilization of about 65% of the ethylene oxide charged, the remainder having been lost.

Example 4

100 parts of polyvinyl alcohol from the same lot as before, 200 parts of n-hexane and, 40 parts of propylene oxide were reacted for 10 hours at an average temperature of 100° C. and an average pressure of 50 p.s.i., without previous removal of water. The product, recovered as before, showed hydroxypropyl content equal to 9.3% of the weight of the vinyl alcohol used.

Example 5

100 parts of polyvinyl alcohol of the same lot, 150 parts of n-hexane, and 50 parts of butylene oxide were heated and agitated for 14½ hours at an average temperature of 95° C. and an average pressure of 52 p.s.i. The product, recovered as before, showed 3% of butoxylation.

Example 6

The composition and procedures of Example 3 are used except that the ethylene oxide is replaced by an equivalent quantity of styrene oxide as the alkylene oxide used and the reaction time is extended to 12 hours.

Example 7

The composition and procedures of Example 4 are used except that 2 parts of sodium hydroxide are included as alkoxylation catalyst in the charge to the reactor and neutralized as by acetic acid, if any is required, in the final product.

In a modification of this example, the sodium hydroxide is replaced by an equal weight of any of the other alkoxylation catalysts disclosed herein.

Example 8

The composition and procedures of Example 1 are used except that 2 parts of acetic acid are added to the charge and the acetic acid is removed from the final product in any convenient manner, as by being distilled out as an ester-alcohol.

In a modification of this example, the acetic acid is replaced by an equal weight of sodium or potassium acetate or carbonate or of lime.

Example 9

The alkoxylated PVA product prepared as described herein may be used as a mold release or parting agent in processing various plastics.

The product is dependably and quickly soluble in water and is particularly adapted, therefore, for use as a water soluble packaging material. Thus a medicament may be enclosed in a capsule or ampule and a detergent or soap powder in a small envelope of the material. In another embodiment a seed tape, wherein seeds are embedded at the proper distances for planting, may be made with film in relatively thick film or sheet form.

In making the film, the alkoxylated polyvinyl alcohol of any of the examples above, suitably plasticized with 5%–30% or so of any conventional plasticizer for polyvinyl alcohol, is heated to the temperature of softening of the plastic to extrudable condition but below the temperature of decomposition, and is extruded through a slit orifice. In an alternative procedure, the alkoxylated product is dissolved in water as, for instance, in warm water, as at 60°–90° C., and to concentration of the alkoxylated PVA to give a solution of about the viscosity of a light syrup suitable for casting into a film on the smooth surface of a film-casting wheel or plate. The film is cast on the surface in such amount that, after removal of the water, there will be left a film of desired thickness, as for example 0.0002–0.003 inch. The water is removed by evaporation in warm air and the final drying may be effected after the film, in coherent form, is stripped from the said smooth surface and as the film is passed through a subsidiary drying oven.

Once the film is formed, the water soluble packages of kind, dimensions, and conventional form of sealing are made, filled, and then sealed in usual manner.

Thicker films or sheets of thickness 0.003–0.010 or more are made as described for use as bag material for holding various reacting chemicals or storing or delivering products that would corrode metal in contact with the chemicals or products.

Films made as described from the PVA that has been dried before alkoxylation, being free from the usual content of by-product glycol and alkoxylated derivatives of the glycol, are usable without interference from any active solvent such as the glycol and its derivatives.

Example 10

A sponge is made as follows:

Alkoxylated polyvinyl alcohol made as described in any of the Examples 1–6, 100 parts, is mixed with commercial formalin solution in amount to provide 10–70 parts of actual formaldehyde, ordinarily 20–50 parts, 2 of commercial concentrated hydrochloric acid or like catalyst of acetalization, and suitably also a small proportion of foaming agent.

Examples of the foaming agent to be used are the foaming surface active agents, examples of which are the sodium salts of sulfonated monoglyceride of coconut oil fatty acids, polymerized alkylated arene sulfonic acid (Daxad No. 11), sulfonated lignin (Marasperse C), sodium lauryl sulfate, sodium dodecyl benzene sulfonate, glycerine monostearate, sorbitan monolaurate, ethoxylated sorbitan monolaurate, and cetyltrimethylammonium bromide. Anionic, non-ionic and cationic surface active agents may be used provided they are of the foaming type which promote suspension of air or other gas bubbles in aqueous solution. When an acid catalyst is used, the surface active agent selected is one that is effective in acid solution. The proportion of foaming agent used is that which is usual for the particular agent selected, as for instance, 0.1–5 parts in the present mix.

The whole mix is whipped or otherwise agitated with air, carbon dioxide, nitrogen, or like insoluble gas, to foam the mass and increase the volume, as to 2–5 times the original volume of the liquid. Moderate warming, to 50°–90° C. or so, may be used if it is desired to accelerate the reaction. As the reaction proceeds, the formal (an acetal or a hemiacetal) of the ethoxylated PVA results and the foamed material gradually becomes tough and resilient. When the consistency becomes about that of a wet sponge, the reaction is discontinued by removing the acid catalyst, as by neutralization with soda ash or like alkali. The mass is then allowed to drain and is dried in warm air at temperatures up to about 100° C. It is then ready to be cut into shapes and sizes desired for use as a lightweight foam material.

To increase the water absorption of the sponge so made, the communication between the cells within the sponge may be increased in any conventional manner, as by subjecting the sponge in dry condition to manipulation such as high compression to cause rupture of the walls separating the individual cells.

In modifications of this example, other aldehydes that are solvents for the alkoxylated PVA, either alone or in water, are substituted on an equivalent weight basis for the formaldehyde. Such aldehydes that may be substituted include acetaldehyde, propionaldehyde, butyraldehyde, glyoxal, and succinaldehyde.

Example 11

The procedure of Example 10 is followed except that 100 parts of Hylene T (toluene-2,4-diisocyanate) is stirred into the original mix. The said moderate warming is supplemented by heating finally to 100° C. until substantially no more gas is evolved, and the aeration is omitted.

The carbon dioxide gas so generated provides the bubbles required to make a foamed product.

Example 12

Equal weights of the alkoxylated PVA made as described in any of the Examples 1–6 and Hylene T were mixed and heated on a steam bath until carbon dioxide was generated and a hard solid product remained. The product was insoluble in water, methanol and butyl alcohol.

Example 13

The ethoxylated PVA made as described in Example 1 was mixed with 1–2 times its weight of Hylene T and with water in various proportions, namely, 1 part, 3 parts, and 5 parts. The fastest rate of reaction was found when the proportion of water was 3 parts for 1 of the ethoxylated PVA. When the proportion of water was decreased substantially, heating was required to give a satisfactory rate of reaction. With proportions of water above 3, the reaction was also slowed somewhat.

All the products made in this example were rubbery and sponge-like when wet. They were slightly yellow in color and insoluble in water.

The sponge-like materials were dried as by standing in air for several days or more rapidly in a drying oven at the elevated temperature of 70°–100° C.

In place of the Hylene T used in this example, there may be used equivalent proportions of other diioscyanates as, for instance, benzene or xylene diisocyanate or ethylene, tetramethylene, or octamethylene diisocyanate.

Corresponding monoisocyanates may be substituted for the diisocyanates when a relatively low molecular weight product is desired. Also mixed diiso- and isocyanate is used when the chain length terminating effect of the monoisocyanate is to be obtained in a product for a particular use.

The temperature of heating with the alkoxylated PVA may be as high as 120°–200° C. for 1–3 hours or so.

The proportion of the diisocyanate used in Examples 12–13 may be varied, as from 0.5–2 parts for 1 part of the alkoxylated PVA.

The products of Examples 10–13 are useful for making foam products for structural or like purposes and in making sponges. For sponges, the material that is yieldable when wet is selected. The escape of the carbon dioxide gas gives intercommunication between the various cells and by breaking the dried cellular material by the application of very high pressure, as described in Example 10, we increase the intercommunication.

Example 14

Ethoxylated polyvinyl alcohol in 10% aqueous solution is oxygenated by being mixed with 2%–10% of 30% solution of hydrogen peroxide or with 1%–5% of sodium perborate. The mixture is allowed to stand until reaction is substantially complete.

The product is cross-linked, has a gel-like structure, and has resilient elastomeric properties.

The product may be compounded with usual components and formed into compositions for use in making films and coatings.

In place of the ethoxylated polyvinyl alcohol here used, there may be substituted, on an equi-molar basis, any one of the other alkoxylated polyvinyl alcohol products disclosed earlier herein.

Example 15

A 5% solution of the ethoxylated polyvinyl alcohol, as prepared in Example 1, is applied to 20s cotton warp yarns, which are subsequently dried over steam-heated cylinders, to give yarns which show excellent flexibility and strength and may be woven without excessive shedding or "end-breakage," the size being readily removable by rinsing in water at room temperature.

In a modification of this example, regenerated cellulose rayon and cellulose acetate filament rayon yarns are treated separately with a 3% solution of ethoxylated polyvinyl alcohol, with like results.

An 8% solution of ethoxylated polyvinyl alcohol is applied to filament nylon hosiery yarn on a single thread winder by contact with a rotating roller dipping into a trough of sizing mixture to give a yarn of good knitting properties and finally hosiery free from snags and broken yarns.

Example 16

We have successfully alkoxylated cellulosic material such as wood flour by the general procedure of Example 1 in which wood flour is substituted for the polyvinyl alcohol. The proportion used for the polyxinyl alcohol is recommended also as that for the wood flour. In addition, we introduce with the wood flour a catalytic proportion of sodium hydroxide such as 1%–3% of the weight of the wood flour.

The use of the insolubilizing liquid results in a satisfactory, smooth alkoxylation of the wood flour without the use of such excessive amounts of sodium hydroxide or like alkali as to introduce problems in the separation of the alkali from the finished product.

The alkoxylated wood flour so made was soluble to a substantial extent to n-butanol.

It is to be understood that it is intended to cover all changes and modifications of the examples of the invention herein chosen for the purpose of illustration which do not constitute departures from the spirit and scope of the invention.

What we claim is:

The water insoluble product of the acid catalyzed reaction of 100 parts by weight of alkoxylated polyvinyl alcohol with 5–100 parts of a monoepoxy $C_2$–$C_4$ alkylene oxide and then with an aqueous solution of 10–70 parts of formaldehyde calculated on the dry basis.

References Cited in the file of this patent

UNITED STATES PATENTS

| | | |
|---|---|---|
| 1,998,544 | Jochum et al. | Apr. 23, 1935 |
| 2,133,125 | Voss et al. | Oct. 11, 1938 |
| 2,227,997 | Berg | Jan. 7, 1940 |
| 2,277,083 | Dorough | Mar. 24, 1942 |
| 2,844,570 | Broderick | July 22, 1958 |
| 2,941,988 | Wolf | June 21, 1960 |

FOREIGN PATENTS

| | | |
|---|---|---|
| 361,691 | Great Britain | Nov. 26, 1931 |
| 364,323 | Great Britain | Jan. 7, 1932 |
| 368,530 | Great Britain | Mar. 10, 1932 |
| 575,141 | Germany | Apr. 25, 1933 |